United States Patent
McGorrin et al.

(10) Patent No.: US 7,365,108 B2
(45) Date of Patent: Apr. 29, 2008

(54) PIGMENTED INK-JET INKS WITH IMPROVED PRINT QUALITY AND RELIABILITY

(75) Inventors: Marlene McGorrin, Corvallis, OR (US); Zia Rehman, Corvallis, OR (US); Paul Tyrell, Corvallis, OR (US); Mary E Austin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 412 days.

(21) Appl. No.: 10/891,574

(22) Filed: Jul. 14, 2004

(65) Prior Publication Data

US 2006/0014856 A1   Jan. 19, 2006

(51) Int. Cl.
*C09D 11/00* (2006.01)

(52) U.S. Cl. ................... 523/160; 523/161

(58) Field of Classification Search ........... 523/160, 523/161
See application file for complete search history.

(56) References Cited

U.S. PATENT DOCUMENTS

| | | | |
|---|---|---|---|
| 4,072,644 A | 2/1978 | Hedrick | |
| 4,137,083 A | 1/1979 | Hedrick | |
| 5,261,953 A | 11/1993 | Vieira et al. | |
| 5,571,311 A * | 11/1996 | Belmont et al. | 106/31.28 |
| 5,596,027 A | 1/1997 | Mead et al. | |
| 5,997,769 A | 12/1999 | Tittmann et al. | |
| 6,221,143 B1 * | 4/2001 | Palumbo | 106/31.6 |
| 6,232,405 B1 * | 5/2001 | Schmidhauser et al. | 525/327.6 |
| 6,369,267 B1 | 4/2002 | Toan et al. | |
| 6,378,999 B1 * | 4/2002 | Doi et al. | 347/100 |
| 6,394,594 B1 * | 5/2002 | Katsuragi et al. | 347/100 |
| 6,652,055 B2 * | 11/2003 | Oikawa | 347/9 |
| 6,790,878 B2 * | 9/2004 | Kurabayashi | 523/160 |
| 6,874,881 B2 * | 4/2005 | Suzuki et al. | 347/100 |
| 2001/0021439 A1 | 9/2001 | Sumita et al. | |
| 2002/0094320 A1 | 7/2002 | Toan et al. | |
| 2003/0018120 A1 | 1/2003 | Lee et al. | |
| 2003/0202137 A1 | 10/2003 | Nakamura et al. | |
| 2004/0016367 A1 * | 1/2004 | Koike et al. | 106/31.86 |
| 2004/0018357 A1 | 1/2004 | Andre et al. | |
| 2004/0024135 A1 | 2/2004 | Verge et al. | |
| 2004/0061756 A1 | 4/2004 | Kelly-Rowley et al. | |
| 2005/0206703 A1 * | 9/2005 | Guo et al. | 347/100 |
| 2005/0209363 A1 * | 9/2005 | Rehman et al. | 523/160 |

FOREIGN PATENT DOCUMENTS

EP   1 231 245 A1   8/2002

* cited by examiner

*Primary Examiner*—Edward J. Cain

(57) ABSTRACT

An ink includes a jettable vehicle, a plurality of pigment solids dispersed in the jettable vehicle, and a styrene-maleimide copolymer dispersed in the jettable vehicle. Additionally, a method of rapidly printing an ink-jet image including ink-jetting an ink-jet ink onto a media substrate at a firing frequency from 12 kHz to 25 kHz, wherein the ink-jet ink includes a jettable vehicle, a plurality of non-acid-functionalized pigment solids dispersed in the jettable vehicle, and a styrene-maleimide copolymer dispersed in the jettable vehicle.

65 Claims, 1 Drawing Sheet

PIGMENTED INK-JET INKS WITH IMPROVED PRINT QUALITY AND RELIABILITY

FIELD

The present system and method relate generally to ink-jet ink compositions. More particularly, the present system and method relate to pigment-based ink-jet inks that exhibit improved print quality and reliability, even after long term storage periods.

BACKGROUND

Ink-jet printing has become a popular way of recording images on various media surfaces, particularly paper, for a number of reasons, including, low printer noise, capability of high-speed recording, and multi-color recording. Additionally, these advantages of ink-jet printing can be obtained at a relatively low price to consumers. Though there has been great improvement in ink-jet printing, improvements are followed by increased demands from consumers for higher speeds, higher resolution, full color image formation, increased stability, etc.

As new ink-jet inks and print engines are developed, several traditional characteristics are considered when evaluating the ink in conjunction with a printing surface or substrate. Such characteristics include edge acuity and optical density of the image on the surface, gloss, black to color bleed control, dry time of the ink on the substrate, adhesion to the substrate, lack of deviation in ink droplet placement, presence of all dots, resistance of the ink after drying to water and other solvents, long term storage stability, and long term reliability without pen material degradation or nozzle clogging. The long term reliability without material degradation or nozzle clogging becomes even more important with the advent of print engines that eject smaller drop volumes. Though the above list of characteristics provides an illustration of factors to be optimized for improved ink-jet printing, there are challenges associated with satisfying all of the above characteristics. Often, the inclusion of an ink component meant to satisfy one of the above characteristics can prevent another characteristic from being met. Thus, traditional commercial inks for use in ink-jet printers represent a compromise in an attempt to achieve at least an adequate response in meeting all of the above listed characteristics.

One characteristic of ink-jet printing systems that is desirable to achieve is related to frequency response of the ink-jet ink, which is often proportional to ink throughput. Smaller drop sizes have increased the demand for higher frequency printing. With respect to this aspect, obtaining increased printing speed while retaining acceptable print quality is a constant challenge in the ink-jet printing industry.

With respect to other aspects, improvement in black ink print quality, particularly with respect to optical density and bleed control, has been a consideration in the advancement of the ink-jet arts. Additionally, achieving acceptable optical density and bleed control in print reliable systems is also a consideration. For example, in one aspect, many ink-jet printing customers in the home printing market will often use a printer infrequently, or have lengthy breaks from use. Thus, some customers require reliable printing after long periods of down time, such as may occur as a result of a vacation or as a result of a summer break for students. As such, inks for such markets would benefit from formulations having long term storage stability in bottles, in print cartridges, and when loaded in a printer.

Accordingly, investigations continue into developing ink formulations that can be printed accurately at high frequencies, and which have good print quality and storage stability.

SUMMARY

In one aspect of the present system and method, a system for printing images on a substrate includes a jettable ink, and a printhead loaded with the jettable ink, wherein the jettable ink includes a jettable vehicle, the vehicle including water; a plurality of non-acid-functionalized pigment solids dispersed in the jettable vehicle, and a styerene-maleimide copolymer dispersed in the jettable vehicle.

In another embodiment, a method of rapidly printing an ink-jet image, includes ink-jetting an ink-jet ink at a firing frequency from 12 kHz to 25 kHz, the ink-jet ink including a jettable vehicle, a plurality of non-acid-functionalized pigment solids dispersed in the jettable vehicle, and a styerene-maleimide copolymer dispersed in the jettable vehicle.

In another embodiment, an ink-jet ink composition includes a jettable vehicle, a plurality of pigment solids dispersed in the jettable vehicle, and a styerene-maleimide copolymer dispersed in the jettable vehicle.

BRIEF DESCRIPTION OF THE DRAWINGS

The accompanying drawing illustrates various embodiments of the present invention and is a part of the specification. The illustrated embodiment is merely an example of the present invention and does not limit the scope of the invention.

Throughout the drawing, identical reference numbers designate similar, but not necessarily identical, elements.

DETAILED DESCRIPTION

Figure 1:
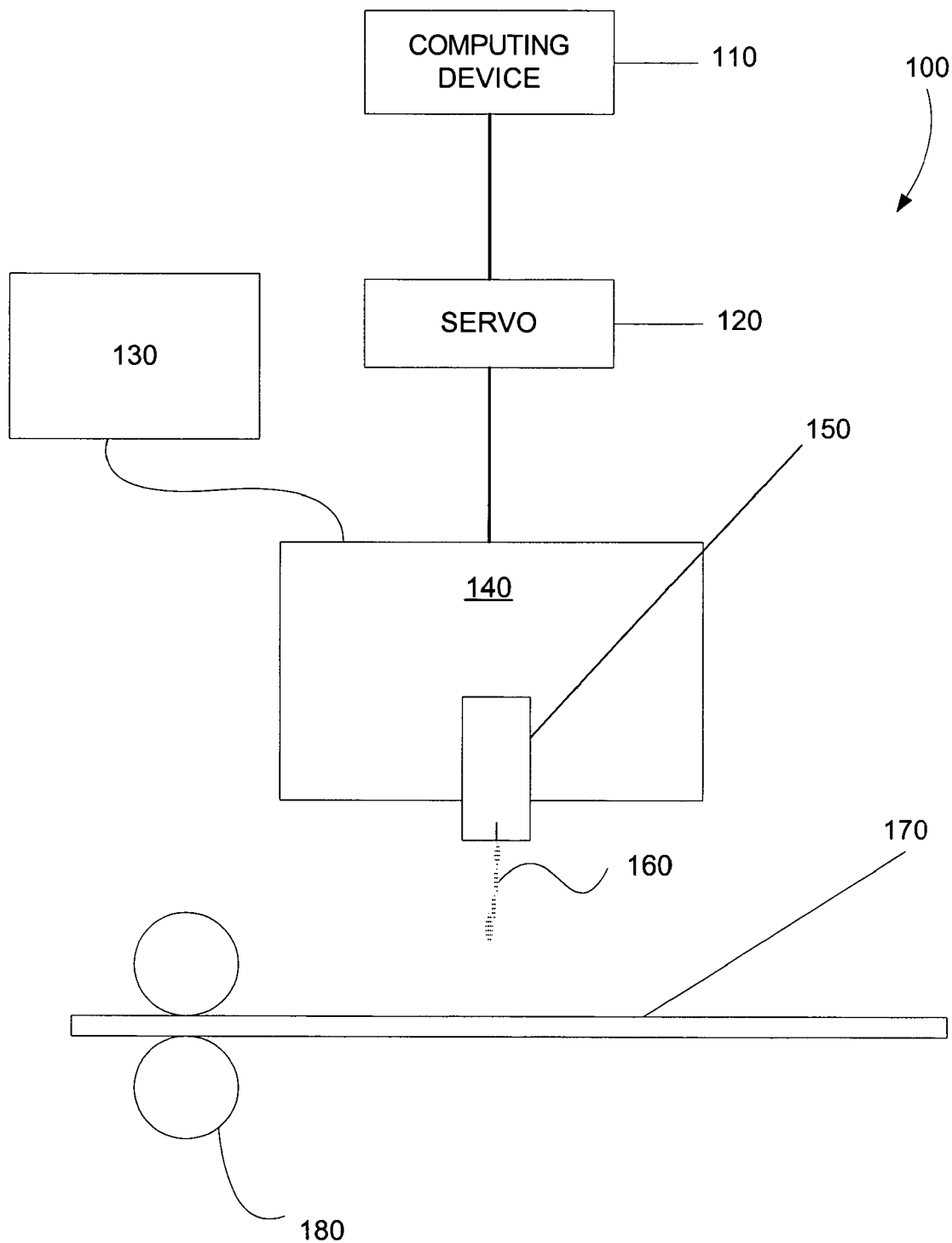
FIG. 1 is a simple block diagram illustrating an ink-jet material dispensing system, according to one exemplary embodiment.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

In the present specification, and in the appended claims, the following terminology will be used:

The singular forms "a," "an," and "the" include plural referents unless the context clearly dictates otherwise. Thus, for example, reference to "a pigment" includes reference to one or more of such materials.

The term "about" when referring to a numerical value or range is intended to encompass the approximate values, i.e., not the exact stoichiometries but a range of stoichiometries such as in the ratios of the copolymers in the present system.

As used herein, "liquid vehicle" is defined to include liquid compositions that can be used to carry colorants, including pigments, to a substrate. Liquid vehicles are well known in the art, and a wide variety of liquid vehicle components may be used in accordance with embodiments of the present invention. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

As used herein, "pigment" refers to a colorant particle which is typically substantially insoluble in the liquid vehicle in which it is used.

"Non-acid-functionalized pigment" or a derivation thereof, refers to pigments that have been functionalized with non-acidic dispersing agent, such as by chemical attachment of the non-acidic dispersing agent to the surface of the pigment. A dispersing agent can be attached to such pigments to terminate the outer shell of the pigment with either positive charges or both positive and negative charges, thereby creating a repulsive nature that reduces agglomeration of pigment particles within the liquid vehicle. Exemplary non-acidic materials that can be attached to the surface of such pigments include, but are in no way limited to, aromatic amine materials with cationic or mixed ionic functional groups and isomers and combinations thereof. After non-acid-function attachment, the pigments that can be present include, but are in no way limited to, negative counter-ions such as chloride, bromide, iodide, fluoride, nitrate, sulfate, acetate, citrate, benzoate, etc.; and positive counter-ions such as ammonium, sodium, potassium, and lithium, etc.

"Frequency response" refers to the performance of ink-jet ink and ink-jet architecture used in combination with respect to ink-jet ink firing speed, e.g., dots fired per unit of time. Generally, a nozzle firing frequency that is higher than contemplated for use with respect to a specific ink-jet ink and ink-jet architecture can result in poorer print performance, such as by producing misdirected ink drops and other undesirable characteristics. By current standards, firing frequencies above about 12 kHz are considered to be fast printing frequencies.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

As used herein, "bleed" refers to the tendency of ink to run into and mix with adjacently printed inks. "Feathering" refers to the tendency of ink to spread undesirably into unprinted areas of the media substrate. Bleed and feathering typically occur prior to the printed inks fully drying on a substrate. The degree of bleed will depend on a variety of factors such as the drying speed of the ink, agglomeration of the colorant, and ink chemistry in general, among other variables.

"Edge acuity" refers to the crispness of a printed image along the border of the image.

In the following description, for purposes of explanation, numerous specific details are set forth in order to provide a thorough understanding of the present system and method for producing and using pigment-based ink-jet inks that exhibit improved print quality and reliability, even after long term storage periods. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

FIG. 1 illustrates an exemplary system (100) that may be used to apply a pigment-based ink-jet ink (160) to an ink receiving medium (170) according to one exemplary embodiment. As shown in FIG. 1, the present system includes a computing device (110) controllably coupled through a servo mechanism (120) to a moveable carriage (140) having an ink-jet dispenser (150) disposed thereon. A material reservoir (130) is also coupled to the moveable carriage (140), and consequently to the ink-jet print head (150). A number of rollers (180) are located adjacent to the ink-jet dispenser (150) configured to selectively position an ink receiving medium (170). While the present exemplary system (100) is described in the context of applying a pigment-based ink-jet ink (160) onto an ink receiving medium (170), the present system and method may be used to mark any number of items with the present pigment-based ink-jet ink. The above-mentioned components of the present exemplary system (100) will now be described in further detail below.

The computing device (110) that is controllably coupled to the servo mechanism (120), as shown in FIG. 1, controls the selective deposition of a pigment-based ink-jet ink (160) on an ink receiving medium (170). A representation of a desired image or text may be formed using a program hosted by the computing device (110). That representation may then be converted into servo instructions that are then housed in a processor readable medium (not shown). When accessed by the computing device (110), the instructions housed in the processor readable medium may be used to control the servo mechanisms (120) as well as the movable carriage (140) and ink-jet dispenser (150). The computing device (110) illustrated in FIG. 1 may be, but is in no way limited to, a workstation, a personal computer, a laptop, a personal digital assistant (PDA), or any other processor containing device.

The moveable carriage (140) of the present printing system (100) illustrated in FIG. 1 is a moveable material dispenser that may include any number of ink-jet material dispensers (150) configured to dispense the present pigment-based ink-jet ink (160). The moveable carriage (140) may be controlled by a computing device (110) and may be controllably moved by, for example, a shaft system, a belt system, a chain system, etc. making up the servo mechanism (120). As the moveable carriage (140) operates, the computing device (110) may inform a user of operating conditions as well as provide the user with a user interface.

As an image or text is printed on an ink receiving medium (170), the computing device (110) may controllably position the moveable carriage (140) and direct one or more of the ink-jet dispensers (150) to selectively dispense a pigment-based ink-jet ink at predetermined locations on ink receiving medium (170) as digitally addressed drops, thereby forming the desired image or text. The ink-jet material dispensers (150) used by the present printing system (100) may be any type of ink-jet dispenser configured to perform the present method including, but in no way limited to, thermally actuated ink-jet dispensers, mechanically actuated ink-jet dispensers, electrostatically actuated ink-jet dispensers, magnetically actuated dispensers, piezoelectrically actuated dispensers, continuous ink-jet dispensers, etc.

The material reservoir (130) that is fluidly coupled to the ink-jet material dispenser (150) houses the present pigment-based ink-jet ink (160) prior to printing. The material reservoir may be any container configured to hermetically seal the pigment-based ink-jet ink (160) prior to printing and may be constructed of any number of materials including, but in no way limited to metals, plastics, composites, or ceramics. As illustrated in FIG. 1, the material reservoir (130) may be separate from, yet fluidly coupled to the ink-jet material dispenser (150). Alternatively, the material reservoir (130) may be directly coupled to and form a part of the ink-jet material dispenser (150).

FIG. 1 also illustrates the components of the present system that facilitate reception of the pigment-based ink-jet ink (160) onto the ink receiving medium (170). As shown in FIG. 1, a number of positioning rollers (180) may transport and/or positionally secure an ink receiving medium (170) during a printing operation. Alternatively, any number of belts, rollers, substrates, or other transport devices may be used to transport and/or postionally secure the ink receiving medium (170) during a printing operation, as is well known in the art.

Frequency response of a pigmented ink-jet ink stored in the material reservoir (130) and dispensed by the ink-jet material dispenser (150) can be proportional to the printing system (100) throughput ability. In ink-jet printing systems, it can be desirous to provide ink and architecture systems that can exhibit a high upper frequency limit while maintaining a functional frequency bandwidth within a lower range. The present system and method uses certain components in combination to increase the range of frequency response for a given ink-jet architecture and ink-jet ink combination, as well as provide ink-jet inks that are stable over long periods of dormancy. Moreover, the present system and methods can provide ink-jet inks that have high print quality, e.g., high optical density, reduced bleed, reduced misdirected firing, etc. Further, the operational frequency bandwidth can also be expanded using the combinations disclosed herein. For example, by increasing the upper frequency limit that can be used to jet a particular ink-jet ink, the effective range of frequency response of an ink can be increased. Thus, in one exemplary embodiment, a printhead can be configured to jet the ink-jet ink at a firing frequency from 12 kHz to 25 kHz, or even from 15 kHz to 25 kHz or 18 kHz to 25 kHz, in some embodiments. Though a high frequency range is provided, these same inks can also be jetted at from 3 kHz to 12 kHz as well, which is more common amongst many of the inks currently available on the market. Thus, the frequency response range of these ink-jet inks can be quite broad, e.g., from 3 kHz to 25 kHz. These firing frequencies can be at any functional drop volume, though drop volumes from about 1 pL to 20 pL can be desirable in providing a balance between printing speed and image quality. The formation and composition of the pigment-based ink-jet ink (160) will now be described in detail below.

Exemplary Composition

In accordance with the present system and method, a system for printing images on a substrate can include an ink-jet ink (160) and a printhead or other material dispenser (150) loaded with the ink-jet ink. The ink-jet ink can include a liquid vehicle, from 0.1 wt % to 6 wt % of non-acid-functionalized pigment solids, and from 0.001 wt % to 6 wt % of styrene-maleimide copolymer. In a more detailed aspect, the liquid vehicle can include water and from 5 wt % to 35 wt % of total organic solvent content and the styrene-maleimide copolymer having a weight average molecular weight from about 400 Mw to 15,000 Mw.

In another exemplary embodiment, a method of rapidly printing an ink-jet image includes ink-jetting an ink-jet ink (160) onto an ink receiving medium (170) at a firing frequency from 12 kHz to 25 kHz. The ink-jet ink (160) can include a liquid vehicle, from 0.1 wt % to 6 wt % of non-acid-functionalized pigment solids, and from 0.001 wt % to 6 wt % of styrene-maleimide copolymer. In this embodiment, the liquid vehicle can include water and from 5 wt % to 35 wt % of total organic solvent content and the styrene-maleimide copolymer can have a weight average molecular weight from about 400 Mw to 15,000 Mw.

In yet another exemplary embodiment, an ink-jet ink (160) composition can comprise a liquid vehicle, from 0.1 wt % to 6 wt % of non-acid-functionalized pigment solids, and from 0.001 wt % to 6 wt % of styrene-maleimide copolymer. In a more detailed aspect, the liquid vehicle can include water and from 5 wt % to 35 wt % of total organic solvent content and the styrene-maleimide copolymer can have a weight average molecular weight from about 400 Mw to 15,000 Mw.

The ink-jet ink compositions of the present system and method are typically prepared using an aqueous formulation or liquid vehicle which can include water, co-solvents, surfactants, buffering agents, biocides, sequestering agents, viscosity modifiers, humectants, binders, and/or other known additives. Solids can also be present, such as pigment solids and other polymeric solids. In one exemplary aspect of the present system and method, the liquid vehicle can comprise from about 70 wt % to about 99 wt % of the ink-jet ink composition.

As mentioned, the ingredients that can be present in these ink-jet inks (160) in accordance with embodiments of the present exemplary systems and methods include non-acid-functionalized pigment solids, styrene-maleimide copolymer, organic co-solvent(s), and water. Optionally, other components can also be present including, but in no way limited to, salts, surfactants, biocides, buffers, viscosity modifiers, sequestering agents, stabilizing agents, polymers, UV curable materials, plasticizers, etc. as will be discussed in further detail below.

Non-acid-functionalized Pigment

The non-acid-functionalized pigment can be of any color used in the ink-jet arts. Though any color can be used, black carbon pigments are described in an exemplary manner to favorably set forth certain principles of the present system and method. Specifically, in this exemplary embodiment, a carbon pigment can be functionalized with a non-acidic dispersant. The non-acidic dispersant is typically prepared in a precursor form, and then the precursor is attached to the pigment to chemically modify the surface of the pigment. In one exemplary embodiment, the dispersant can be attached to the carbon black using various non-acidic precursor materials, such as aromatic amine materials with cationic or mixed ionic functional groups, and isomers thereof, for example. Other non-acidic precursors can also be used to attach to the carbon black, as would be known by those skilled in the art.

The carbon pigment can be almost any commercially available carbon pigment that provides acceptable optical density and print characteristics. Carbon pigments suitable for use in the present system and method include, but are in no way limited to, carbon black, graphite, vitreous carbon, charcoal, and combinations thereof. In one aspect of the present system and method, the carbon pigment is a carbon black pigment. Such carbon black pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, but are in no way limited to, Cabot pigments such as MONARCH 1400, MONARCH 1300, MONARCH 1100, MONARCH 1000, MONARCH 900, MONARCH 880, MONARCH 800, MONARCH 700; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont.

Typically the carbon black pigments of the present system and method can be from about 5 nm to about 10 μm and in one aspect can be from 10 nm to about 500 nm in size, although sizes outside this range can be used if the pigment can remain dispersed and provide adequate color properties. In one detailed aspect of the present system and method, the functionalized carbon pigment comprises from about 0.1 wt % to about 6 wt % of the ink-jet ink composition.

While black pigments are described in some detail above, other pigment colors can also be used by the present system and method.

Styrene-maleimide Copolymers

In addition to the pigment solids that can be present in the ink-jet inks of the present systems and methods, a styrene-maleimide copolymer can also be present. Styrene-maleimide copolymers can be generally depicted in accordance with Formula 1 as follows:

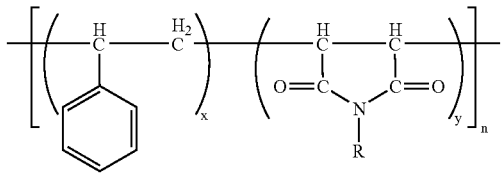

Formula 1 where x can be from 1 to 4, y can be a fraction from 0 to 1, and n can be from 2 to 27. Additionally, R can be any functional group including, but in no way limited to, hydrocarbons and or aromatic amines, amides, acids, esters, ethers, etc., and salts thereof. With respect to x, the structure shown in Formula 1 is not intended to imply that any particular positional order is present, but merely that when x is 1, the styrene to maleimide molar ratio of the resin is about 1:1; when x is 2, the styrene to maleimide molar ratio of the resin is about 2:1; when x is 3, the styrene to maleimide molar ratio of the resin is about 3:1; and when x is 4, the styrene to maleimide molar ratio of the resin is about 4:1. Typically, the styrene units and the maleimide units can be positioned somewhat randomly.

As made apparent by Formula 1, styrene-maleimide resins are a family of low molecular weight copolymers of styrene and maleimide. Various resins can have a variety of chemical structures and can exhibit a variety of properties, including, but in no way limited to, low acid equivalent values, a range of amine functionality (or "amine index") which in turn affects the solution properties of their cationic derivatives, acceptable thermal stability, and high glass transition temperature (Tg). Additional properties of styrene maleimide resins include: low viscosity behavior at high solids concentrations in aqueous acid solutions.

If R=a primary, secondary, or tertiary amine, styrene maleimide resins can be protonated with acid to form acid salts. By way of example, Formula 2 below shows styrene dimethylaminopropylamine maleimide copolymer converted with nitric acid to form a trialkyl ammonium nitrate salt. (A trialkyl ammonium carboxylate salt could be formed using acetic acid, etc.) Another example is illustrated in Formula 3 below, which shows styrene dimethylaminoproplyamine maleimide copolymer derivatives which are quarternary salts by addition of an alkyl halide (such as methyl or benzyl chloride) to form tetraalkyl ammonium halide salts.

According to one exemplary embodiment, a nitrate salt of styrene-dimethylaminopropylamine maleimide (where R=dimethylaminopropylamine, a tertiary amine) can be used in the present system and method, as is shown in Formula 2 below:

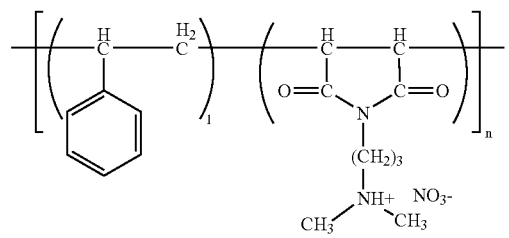

Formula 2

As can be seen by Formula 2, the styrene to dimethylaminopropylamine maleimide molar ratio of the resin is about 1:1, and there are n repeating units (in no particular order). Various other anions can be substituted in place of nitrate ions to provide additional ink-jet properties that are desirable. Additional anions that may be substituted include, but are in no way limited to, bromide, iodide, fluoride, nitrate, acetate, benzoate, citrate, sulfate, etc.

According to another exemplary embodiment, a quarternary salt of styrene-dimethylaminopropylamine maleimide copolymer that may be employed by the present system and method is shown in Formula 3 below.

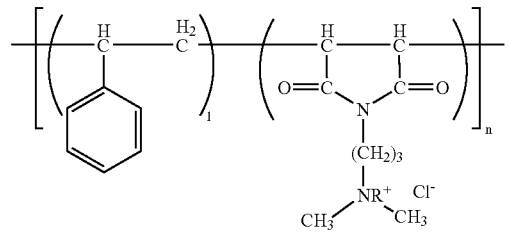

Formula 3

As can be seen by Formula 3, the styrene to dimethylaminopropylamine maleimide molar ratio of the resin is about 1:1, and there are n repeating units (in no particular order). Additionally, Formula 3 shows the composition of the copolymer in the form of a quaternary salt derivative of the imide form. Various other anions can be substituted in place of chloride ions to provide additional ink-jet properties that are desirable. Additional anions that may be substituted include, but are in no way limited to, chloride bromide, iodide, fluoride, etc.

The use of a composition in accordance with Formulas 1, 2 and 3 can provide ink-jet ink properties that are desirable in accordance with embodiments of the present system and method. According to one exemplary embodiment, the styrene-maleimide or derivative and/or salts thereof can be present in the ink-jet ink composition at from 0.001 wt % to 6 wt %, though this range is not intended to be limiting. Additionally, in accordance with the molar ratio of styrene to maleimide, and in accordance with the number of repeating units described in Formula 1, the weight average molecular weight of the styrene-maleimide copolymer that can be used can be from 400 Mw to 15,000 Mw.

Another useful form of a styrene-maleimide copolymer is the styrene-maleamic acid form of the styrene-maleimide copolymer. This form can be generally depicted in accordance with Formula 4 as follows:

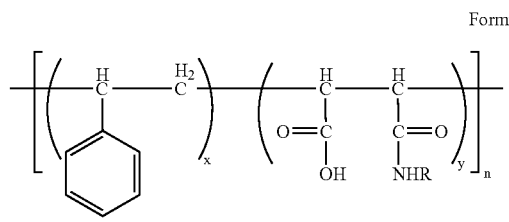

Formula 4 where x can be from 1 to 4, y can be a fraction from 0 to 1, and n can be from 2 to 27. Additionally, R can be any functional group including, but in no way limited to, hydrocarbons and/or aromatic amines, amides, acids, esters, ethers, etc., and salts thereof. With respect to x, the structure shown in Formula 4 is not intended to imply that any particular positional order is present, but merely that when x is 1, the styrene to maleimide molar ratio of the resin is about 1:1; when x is 2, the styrene to maleimide molar ratio of the resin is about 2:1; when x is 3, the styrene to maleimide molar ratio of the resin is about 3:1; and when x is 4, the styrene to maleimide molar ratio of the resin is about 4:1. Typically, the styrene units and the maleimide units can be positioned somewhat randomly.

The subunits within each of the n units in the polymer illustrated in Formula 4 may be different. For example, when x is 1, each of the units contains one styrene subunit, and from 0 to 1 maleamic acid subunit such that the average molar ratio over all n units in the polymer is 1:y, where y can include fractional numbers from 0 to 1. With respect to x, and y, the structure shown in Formula 4 is not intended to imply that any particular positional order is present, but merely that when x is 1, the styrene to maleamic acid molar ratio of the resin is about 1:y. When x is 2, the styrene to maleamic acid molar ratio of the resin is about 2:y; when x is 3, the styrene to maleamic acid molar ratio of the resin is about 3:y; when x is 4, the styrene to maleamic acid molar ratio of the resin is about 4:y, where y can include fractional numbers from 0 to 1. Typically, the styrene units and the maleamic acid units can be positioned somewhat randomly.

As apparent by Formula 4, the maleamic acid version of the styrene imide polymer includes a family of low molecular weight copolymers of styrene and maleamic acid. Various resins can have a variety of chemical structures and can exhibit a variety of properties, including, but in no way limited to, low to mid acid equivalent values, polymer surfactant properties, excellent compatibility with a broad range of formulation ingredients, and increased solvent solubility.

In its salt form, see for example Formula 5 below, the salt of the styrene maleamic acid form of the copolymer can be but is not limited to: an ammonium salt, a lithium salt, a sodium salt, or a potassium salt, etc., for example. In such an embodiment, the maleamic acid unit can each include a cationic counter ion (as exemplified in Formula 5), and the R group on the maleamic acid units can also include counterions (for example in the case above of R=dimethylaminopropylamine maleimide as shown in Formula 2, one anionic counterion for each R group can be present as depicted in Formula 2.)

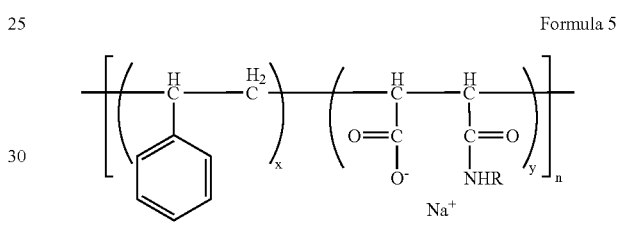

Formula 5

While the above examples of types of styrene-maleimide copolymers are specifically described, additional types of styrene-maleimide copolymers that are functional in accordance with embodiments of the present system and method can also be used. Additionally, when referring to styrene-maleimide copolymer, both here and in the appended claims, it is understood that the imide form of the copolymer, the acid form of the copolymer and their salt forms as well as the quarternary salt forms of the copolymer and any derivatives thereof are also included within this definition. Whether the styrene-maleimide copolymer is in the acid form, in the imide form, or in the quarternary salt form, etc., can, for example, depend on the presence of reactive organic species (for example, organic halides) acids, bases, and salts as well as the pH of the system in which the copolymer is included. Some purposes for inclusion of styrene-maleimide in the ink-jet ink composition is that it provides good black to color bleed control, provides improved optical density (OD), and helps to stabilize the pigments in the dispersion, thereby improving the reliability of ink-jet printhead.

Liquid Vehicle Components

As described previously, a liquid vehicle can be used to carry the pigment solids and the styrene-maleimide, as well as other solids that may be present in the ink-jet ink compositions of the present exemplary system and method. More specifically, the liquid vehicle can include water, and from 5 wt % to 35 wt % total organic solvent content, along with other optional liquid components.

With respect to the total organic co-solvent content, co-solvents for use in the present system and method include, but are in no way limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and/or ketones. For example, co-solvents can include, but are in no way limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly (propylene glycol) alkyl ethers, higher homologs of poly (propylene glycol) alkyl ethers, lactams, substituted formamides, unsubstituted formamides, substituted acetamides, and unsubstituted acetamides.

Specific examples of co-solvents that may be employed in the practice of the present system and method include, but are not limited to, 1,5-pentanediol, 2-pyrrolidone, propylene glycol n-butyl ether, ethoxylated (26) glycerol, ethoxylated (7) glycerol, 2-methyl-2,4-pentanediol, 2-methyl-1,3-propanediol, 2-ethyl-2-hydroxymethyl-1,3-propanediol, diethylene glycol, 3-methoxybutanol, and 1,3-dimethyl-2-imidazolidinone. Co-solvents can be added to reduce the rate of evaporation of water in the ink to minimize clogging or other properties of the ink such as viscosity, pH, surface tension, optical density, and print quality.

Other additives, such as ammonium salts and other salts, can also be included, such as at from 0.1 wt % to 4 wt % in one embodiment. Examples of such salts include ammonium acetate, ammonium sulfate, ammonium benzoate, potassium acetate, sodium acetate, sodium xylene sulfonate, potassium tartarate, sodium tartarate, lithium tartarate. If used, the presence of an ammonium salt can improve edge acuity and reduce bleed of printed images. Ammonium salts can be preferred for use to achieve acceptable waterfastness on certain state of the art printing media.

Various buffering agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid, nitric acid, hydrochloric acid, acetic acid, sulfuric acid; amines such as triethanolamine, diethanolamine, and dimethylethanolamine; and other basic or acidic components. If used, buffering agents typically comprise less than about 10 wt % of the ink-jet ink composition.

In another exemplary aspect of the present system and method, various biocides can be used to inhibit growth of undesirable microorganisms. Several examples of suitable biocides include, but are in no way limited to, benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.05 wt % to about 2 wt %.

In an additional exemplary aspects of the present system and method, binders can be included which act to secure the colorants on the substrate. These binders can be added in addition to the styrene-maleimide copolymers described previously. Binders suitable for use in the present system and method typically have a molecular weight of from about 100 to about 50,000 g/mole. Non-limiting examples include: polyester, polyester-melanine, polyvinylpyrrolidinone, polyethylene glycols and ethers thereof, polysulfones, polyamide, polyvinyl ethers, polyethylene oxides, styrene-acrylimide copolymers and salts thereof, dimethylamino diethyl acrylates, copolymers of dialkylamino ethyl acrylates and methacrylates with styrene or vinyl ethers, styrene-maleimide copolymers and salts thereof, styrene-maleamic acid-alkyl acrylate copolymers and salts thereof, vinyl naphthalene-copolymers with acrylimide or acrylamide and salts thereof, vinyl napthalend-maleimide copolymers and salts thereof, vinyl naphthalene-maleamic acid copolymers, and salts thereof. If the binder is in a particulate dispersed form, then it is not considered to be part of the liquid vehicle, but is considered to be carried by liquid vehicle.

In one exemplary aspect of the present system and method, the ink-jet ink compositions are substantially free of surfactants. However, such components can be used and may include standard water-soluble surfactants such as alkyl polyethylene oxides, alkyl phenyl polyethylene oxides, polyethylene oxide (PEO) block copolymers, acetylenic PEO, PEO esters, PEO amines, PEO amides, and dimethicone copolyols. If used, surfactants can be present at from 0.001 wt % to 10 wt % of the ink-jet ink composition, and in one exemplary embodiment, can be present at from 0.001 wt % to 0.1 wt %.

EXAMPLE

The following example illustrates the embodiments of the system and method that are presently best known. However, it is to be understood that the following is only exemplary or illustrative of the application of the principles of the present system and method. Numerous modifications and alternative compositions, methods, and systems may be devised by those skilled in the art without departing from the spirit and scope of the present system and method. The appended claims are intended to cover such modifications and arrangements. Thus, while the present system and method has been described above with particularity, the following example provides further detail in connection with what is presently deemed to be the most practical and preferred embodiments of the present system and method.

Example 1

A black pigmented ink-jet ink in accordance with the present system and method was prepared using components within the ranges shown in Table 1. The components were combined to form a black ink having a pH of about 4.

TABLE 1

| Component | Test (wt %) |
| --- | --- |
| Ethoxylated (26) glycerol | 2-8 |
| 2-ethyl-2-hydroxymethyl-1,3-propanediol | 2-8 |
| 2-pyrrolidinone | 5-10 |
| Propylene glycol n-butyl ether (PNB) | 0.5-5 |
| Styrene-maleimide copolymer (Formula 1 or Formula 2) | 0.05-2 |
| Non-acid-functionalized black pigment(s) solids | 2-6 |
| Proxel GXL | 0.01-1 |
| Water | balance |

Ammonium hydroxide, nitric acid, or a number of other acids or bases can be used to adjust the pH to about 4.0, as is needed due to compositional differences within the ranges set forth in Table 1. According to the exemplary formulation illustrated in Table 1, the total organic solvent content may vary from 10 wt % to 25 wt %. Additionally, one or more non-acid functionalized pigments having a total solids wt % from 2 wt % to 6 w % may be present in the illustrated example. For example, two different non-acid-functionalized pigments can be blended at from a 1:3 to a 3:1 weight ratio.

Variations of the formulation set forth in Table 1 were tested in identical pen/printer/media systems for frequency response and misdirected firing. The pen used is an HP C6656A, the paper used was Hewlett-Packard Plain Paper, and the printer used was an HP Photosmart 7000 series. After preparing the various inks for testing, a one page print diagnostic was conducted to discern print attributes. The diagnostics utilized are chosen to highlight nozzle performance across a range of firing frequencies (throughput), as well as to determine print quality. Specifically, each of the inks prepared were fired over a range from 3.0 kHz to 19.8 kHz. The frequency response diagnostic is designed to print a series of fired dots in a linear line. Deviation from the desired linearity was evident by observing overlapping adjacent dot rows. This overlap results in dark and light lines commonly referred to as banding or striping. The inks prepared in accordance with the Table 1 ranges typically perform acceptably. Additionally, acceptable bleed and improved edge acuity, as well as other print quality characteristics, are achievable using the inks prepared in accordance with Table 1.

In conclusion, the present system and method for producing and jetting a pigment-based ink-jet ink having improved print quality and reliability include combining a liquid vehicle, non-acid-functionalized pigment solids, and a styrene-maleimide copolymer. The inclusion of the styrene-maleimide copolymer with the non-acid-functionalized pigment solids improves edge acuity and optical density of images formed with the ink-jet ink, gloss, black to color bleed control, dry time of the ink on the substrate, adhesion to the substrate, lack of deviation in ink droplet placement, presence of all dots, resistance of the ink after drying to water and other solvents, long term storage stability, and long term reliability without pen material degradation or nozzle clogging.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An ink comprising:
   a jettable vehicle;
   a plurality of pigment solids dispersed in said jettable vehicle; and
   a styrene dimethylaminopropylamine maleimide copolymer or salts thereof dispersed in said jettable vehicle, said styrene dimethylaminopropylamine maleimide comprising at least one dimethylaminopropylamine functional group;
   wherein said dispersed pigment solids are functionalized with a non-acidic dispersing agent.

2. The ink of claim 1, wherein said jettable vehicle comprises from 5 wt % to 35 wt % total organic solvent content.

3. The ink of claim 1, wherein said functionalized pigment solids comprise from 0.1 wt % to 6 wt % of said ink.

4. The ink of claim 1, wherein said functionalized pigment solids have an average size of approximately 5 nm to approximately 10 μm.

5. The ink of claim 1, wherein said functionalized dispersed pigment solids are formed by a non-acid precursor;
   said non-acid precursor including one of an aromatic amine material with cationic or mixed ionic functional groups, or isomers of an aromatic amine material.

6. The ink of claim 1, wherein said styrene dimethylaminopropylamine maleimide copolymer comprises from 0.001 wt % to 6 wt % of said ink.

7. The ink of claim 6, wherein said styrene dimethylaminopropylamine maleimide copolymer has a weight average molecular weight from approximately 400 Mw to 15,000 Mw.

8. The ink of claim 6, wherein said styrene dimethylaminopropylamine maleimide copolymer is effective to enhance a long term storage stability of said ink.

9. The ink of claim 8, wherein said styrene dimethylaminopropylamine maleimide copolymer is further effective to reduce pen material degradation and nozzle clogging.

10. The ink of claim 6, wherein said styrene dimethylaminopropylamine maleimide copolymer comprises one of a salt, a quarternary salt, or a styrene-maleamic acid.

11. The ink of claim 1, further comprising an anion configured to form a salt with said styrene dimethylaminopropylamine maleimide copolymer.

12. The ink of claim 11, wherein said anion comprises one of a nitrate ion, a bromide ion, an iodide ion, a fluoride ion, an acetate ion, or a sulfate ion.

13. The ink of claim 1, further comprising ammonium salts disposed in said jettable vehicle.

14. The ink of claim 1, further comprising at least one of a buffering agent, a biocide, a binder, or a surfactant.

15. The ink of claim 1, wherein said ink is reliably jettable at a firing frequency of approximately 12 kHz to 25 kHz.

16. The ink of claim 1, wherein said ink is reliably jettable at a drop volume from approximately 1 pL to 20 pL.

17. An ink comprising:
   a jettable vehicle, said vehicle including water and from 5 wt % to 35 wt % total organic solvent content;
   a plurality of non-acid functionalized pigment solids dispersed in said jettable vehicle, said non-acid functionalized pigment solids encompassing from 0.1 wt % to 6 wt % of said ink; and
   a styrene dimethylaminopropylamine maleimide copolymer dispersed in said jettable vehicle encompassing from 0.001 wt % to 6 wt % of said ink, said styrene dimethylaminopropylamine maleimide copolymer having a weight average molecular weight from about 400 Mw to 15,000 Mw;
   wherein said styrene dimethylaminopropylamine maleimide copolymer is effective to increase a useable shelf-life of said ink.

18. The ink of claim 17, wherein said non-acid functionalized pigment solids have an average size of approximately 5 nm to approximately 10 μm.

19. The ink of claim 18, wherein said non-acid functionalized dispersed pigment solids are formed by a non-acid precursor;
   said non-acid precursor including one of an aromatic amine material with cationic or mixed ionic functional groups, or isomers of an aromatic amine material.

20. The ink of claim 17, wherein said styrene dimethylaminopropylamine maleimide copolymer is effective to reduce pen material degradation and nozzle clogging.

21. The ink of claim 17, further comprising ammonium salts disposed in said jettable vehicle.

22. The ink of claim 17, wherein said styrene dimethylaminopropylamine maleimide copolymer comprises one of a salt, a quarternary salt, or a styrene-maleamic acid.

23. The ink of claim 17, further comprising an anion configured to form a salt with said styrene dimethylaminopropylamine maleimide copolymer.

24. The ink of claim 23, wherein said anion comprises one of a nitrate ion, a bromide ion, an iodide ion, a fluoride ion, an acetate ion, or a sulfate ion.

25. The ink of claim 17, further comprising at least one of a buffering agent, a biocide, a binder, or a surfactant.

26. The ink of claim 17, further comprising from 0.001 wt % to 0.3 wt % surfactant.

27. The ink of claim 17, wherein said ink is reliably jetted at a firing frequency of approximately 12 kHz to 25 kHz.

28. The ink of claim 17, wherein said ink is reliably jettable at a drop volume from approximately 1 pL to 20 pL.

29. An ink comprising:
a jettable vehicle, said vehicle including water;
a plurality of non-acid-functionalized pigment solids dispersed in said jettable vehicle;
a non-acidic dispersing agent for functionalizing and dispersing said pigment solids in said jettable vehicle, wherein said dispersing agent is zwitterionic, terminating in both a positive and a negative charge; and
a styerene-maleimide copolymer dispersed in said jettable vehicle.

30. The ink of claim 29, wherein said jettable vehicle comprises from 5 wt % to 35 wt % total organic solvent content.

31. The ink of claim 29, wherein said non-acid functionalized pigment solids comprise from 0.1 wt % to 6 wt % of said jettable ink.

32. The ink of claim 31, wherein said non-acid functionalized pigment solids have an average size of approximately 5 nm to approximately 10 µm.

33. The ink of claim 31, wherein said non-acid functionalized dispersed pigment solids are formed by a non-acid precursor;
said non-acid precursor including one of an aromatic amine material with cationic or mixed ionic functional groups, or isomers of an aromatic amine material.

34. The ink of claim 29, wherein said styrene-maleimide copolymer comprises from 0.001 wt % to 6 wt % of said jettable ink.

35. The ink of claim 34, wherein said styrene-maleimide copolymer has a weight average molecular weight from approximately 400 Mw to 15,000 Mw.

36. The ink of claim 34, wherein said styrene-maleimide copolymer comprises one of a salt, a quarternary salt, or a styrene-maleamic acid.

37. The ink of claim 36, further comprising an anion configured to form a salt with said styrene-maleimide copolymer.

38. The ink of claim 37, wherein said anion comprises one of a nitrate ion, a bromide ion, an iodide ion, a fluoride ion, an acetate ion, or a sulfate ion.

39. The ink of claim 34, wherein said styrene-maleimide copolymer is effective to enhance a long term storage stability of said ink.

40. The ink of claim 39, wherein said styrene-maleimide copolymer is further effective to reduce pen material degradation and nozzle clogging of said printhead.

41. The ink of claim 29, further comprising ammonium salts disposed in said jettable ink.

42. The ink of claim 29, wherein said ink further comprises at least one of a buffering agent, a biocide, a binder, or a surfactant.

43. The ink of claim 29, wherein said ink is reliably jettable from said printhead at a firing frequency of approximately 12 kHz to 25 kHz.

44. The ink of claim 29, wherein said ink is reliably jettable at a drop volume from approximately 1 pL to 20 pL.

45. A method of rapidly printing an ink-jet image, comprising:
ink-jetting an ink-jet ink at a firing frequency from 12 kHz to 25 kHz;
said ink-jet ink including a jettable vehicle, a plurality of non-acid-functionalized pigment solids dispersed in said jettable vehicle, a non-acidic dispersing agent for functionalizing and dispersing said pigment solids in said jettable vehicle, wherein said dispersing agent is zwitterionic, terminating in both a positive and a negative charge, and a styrene-maleimide copolymer dispersed in said jettable vehicle.

46. The method of claim 45, wherein said jettable vehicle of said ink-jet ink comprises from 5 wt % to 35 wt % total organic solvent content.

47. The method of claim 45, wherein said non-acid functionalized pigment solids of said ink-jet ink comprise from 0.1 wt % to 6 wt % of said ink-jet ink.

48. The method of claim 45, wherein said non-acid functionalized pigment solids of said ink-jet ink have an average size of approximately 5 nm to approximately 10 µm.

49. The method of claim 45, wherein said non-acid functionalized dispersed pigment solids of said ink-jet ink are formed by a non-acid precursor;
said non-acid precursor including one of an aromatic amine material with cationic or mixed ionic functional groups, or isomers of an aromatic amine material.

50. The method of claim 45, wherein said styrene-maleimide copolymer comprises from 0.001 wt % to 6 wt % of said ink-jet ink.

51. The method of claim 50, wherein said styrene-maleimide copolymer has a weight average molecular weight from approximately 400 Mw to 15,000 Mw.

52. The method of claim 50, wherein said styrene-maleimide copolymer comprises styrene dimethylaminopropylamine maleimide.

53. The ink of claim 50, wherein said styrene-maleimide copolymer is effective to enhance a long term storage stability of said ink-jet ink and reduce pen material degradation and nozzle clogging of said ink-jet ink.

54. The method of claim 45, wherein said jettable vehicle of said ink-jet ink further comprises ammonium salt.

55. The method of claim 45, further comprising at least one of a buffering agent, a biocide, a binder, or a surfactant.

56. The method of claim 45, wherein said ink-jet ink is reliably jettable at a drop volume from approximately 1 pL to 20 pL.

57. The ink of claim 1, wherein said non-acidic dispersing agent that terminates in a positive charge.

58. The ink of claim 1, wherein said non-acidic dispersing agent is zwitterionic terminating in both a positive and a negative charge.

59. The ink of claim 1, wherein said styrene dimethylaminopropylamine maleimide copolymer comprises average molecular molar ratios of styrene to maleimide from 1:1 to 4:1.

60. The ink of claim 1, wherein each molecule of said styrene dimethylaminopropylamine maleimide copolymer comprises a styrene structural unit repeated between 2 and 108 times and a maleimide structural unit repeated between 2 and 27 times.

61. The ink of claim 1, wherein said styrene dimethylaminopropylamine maleimide copolymer is protonated with nitric acid to form trialkl ammonium salt.

62. The ink of claim 1, wherein said styrene dimethylaminopropylamine maleimide copolymer is protonated with acetic acid to form trialkyl ammonium carboxylate salt.

63. The ink of claim 1, wherein said styrene dimethylaminopropylamine maleimide copolymer is reacted with an alkyl halide to form a tetraalkyl ammonium halide salt.

64. The ink of claim 1, wherein said styrene dimethylaminopropylamine maleimide copolymer comprises a styrene to dimethylaminopropylamine molar ratio of about 1:1.

65. The ink of claim 1, wherein said dispersed pigment solids are carbon black.

* * * * *

UNITED STATES PATENT AND TRADEMARK OFFICE
CERTIFICATE OF CORRECTION

PATENT NO. : 7,365,108 B2
APPLICATION NO. : 10/891574
DATED : April 29, 2008
INVENTOR(S) : Marlene McGorrin et al.

Page 1 of 1

It is certified that error appears in the above-identified patent and that said Letters Patent is hereby corrected as shown below:

On the title page, item (57), under "Abstract", in column 2, line 9, delete "styerene" and insert -- styrene --, therefor.

In column 2, line 14, delete "styerene" and insert -- styrene --, therefor.

In column 2, line 21, delete "styerene" and insert -- styrene --, therefor.

In column 8, lines 18-19, delete "dimethylaminoproplyamine" and insert -- dimethylaminopropylamine --, therefor.

In column 15, line 29, in Claim 29, delete "styerene" and insert -- styrene --, therefor.

In column 16, line 21, in Claim 45, delete "styerene" and insert -- styrene --, therefor.

In column 16, line 53, in Claim 54, delete "salt" and insert -- salts --, therefor.

In column 17, line 8, in Claim 61, delete "trialkl" and insert -- trialkyl --, therefor.

Signed and Sealed this

Twenty-second Day of June, 2010

David J. Kappos
*Director of the United States Patent and Trademark Office*